US008516915B2

(12) United States Patent
Ulbrich et al.

(10) Patent No.: US 8,516,915 B2
(45) Date of Patent: Aug. 27, 2013

(54) CONTROL LEVER FOR A VEHICLE

(75) Inventors: Rene Ulbrich, Hannover (DE); Andreas Tepper, Warendorf (DE); Christian Ehlert, Issy les Moulineaux (FR)

(73) Assignee: CLASS Selbstfahrende Erntemaschinen GmbH, Harsewinkel (DE)

( * ) Notice: Subject to any disclaimer, the term of this patent is extended or adjusted under 35 U.S.C. 154(b) by 160 days.

(21) Appl. No.: 12/878,095

(22) Filed: Sep. 9, 2010

(65) Prior Publication Data

US 2011/0072934 A1 Mar. 31, 2011

(30) Foreign Application Priority Data

Sep. 25, 2009 (DE) ......................... 10 2009 042 785
Nov. 11, 2009 (DE) ..................... 20 2009 015 282 U

(51) Int. Cl.
*B60K 20/00* (2006.01)

(52) U.S. Cl.
USPC ........................................................ 74/473.3

(58) Field of Classification Search
USPC .......... 74/473.1, 473.3, 519, 523, 558, 558.5, 74/551.9; 16/421, 433; 180/315, 324
See application file for complete search history.

(56) References Cited

U.S. PATENT DOCUMENTS

| | | | | |
|---|---|---|---|---|
| 2,222,121 | A * | 11/1940 | Roberts | 74/551.9 |
| 3,530,739 | A * | 9/1970 | Meier | 74/552 |
| 4,082,276 | A * | 4/1978 | Szafianski | 473/550 |
| 6,715,269 | B2 | 4/2004 | Nanlawala et al. | |
| 2005/0034549 | A1 * | 2/2005 | Braud | 74/473.1 |

FOREIGN PATENT DOCUMENTS

| | | | |
|---|---|---|---|
| JP | 2004169334 | A * | 6/2004 |
| JP | 2006218902 | A * | 8/2006 |
| JP | 2007332636 | A * | 12/2007 |

* cited by examiner

*Primary Examiner* — Vicky Johnson
(74) *Attorney, Agent, or Firm* — Michael J. Striker

(57) ABSTRACT

A control lever is provided for controlling a vehicle and has a grip head that includes a gripping surface for a hand of an operator, with air-permeable openings formed in the gripping surface.

10 Claims, 4 Drawing Sheets

CONTROL LEVER FOR A VEHICLE

CROSS-REFERENCE TO RELATED APPLICATION

The invention described and claimed hereinbelow is also described in German Patent Application DE 10 2009 042 785.6 filed on Sep. 25, 2009 and Germany Utility Model Application DE 20 2009 015 282.0 filed on Nov. 11, 2009. This German Patent Application and Germany Utility Model Application, whose subject matter is incorporated here by reference, provide the basis for a claim of priority of invention under 35 U.S.C. 119(a)-(d).

BACKGROUND OF THE INVENTION

The present invention relates to a control lever for controlling a vehicle, in particular a self-propelled working machine such as a tractor, a combine harvester, a forage harvester, an excavator, or the like.

Control levers of that type are generally widespread, and U.S. Pat. No. 6,715,269 B2 can be named as an example, among many other documents. A control lever of that type generally includes a grip head for handling by the user, and a shaft that is displaceable in a guide mechanism and/or is swivelably guided about at least one axis, the position of which specifies an operating state of the vehicle desired by the driver, such as ground speed, direction of travel, or the like. Control elements that can be activated using the fingers of a hand grasping the grip handle to control further functions of the vehicle, as likewise described in U.S. Pat. No. 6,715,269 B2, can be provided on the grip head of a control level of this type.

When working with a vehicle of this type, it is often necessary to firmly grasp the grip handle for long periods of time. Many self-propelled working machines have a driver's cab that is enclosed by large sheets of glass, and so the driver's cab heats up considerably when the sun shines. Sweat that is secreted by the hand that is grasping the grip head cannot evaporate; this is uncomfortable to the driver and can even pose a risk if the hand tends to slip off of the grip head.

The same problems can occur with a vehicle that does not have a closed driver's cab if it is exposed to high external temperatures.

From the field of passenger car design it is known to provide a leather covering on control components that are handled continuously during driving operation, in particular a steering wheel or gear shift lever. A covering of this type is only moderately capable of absorbing sweat that has been secreted. Since a gear shift lever is not grasped continuously, and the position of the hands on the steering wheel changes continuously, the sweat that is absorbed can evaporate, thereby minimizing the risk that the leather will become slippery. This solution is unsuitable for a control lever of a self-propelled working machine for two reasons, namely that a leather surface must be porous in order to absorb moisture and is therefore sensitive to the types of contamination that are common in an agricultural setting, and because the control lever of a self-propelled working machine, unlike a steering wheel, must often be grasped for a long period of time without changing the hand position, thereby preventing absorbed moisture from evaporating.

SUMMARY OF THE INVENTION

A need therefore exists for a control lever that can be grasped continuously by hand for a long period of time without it becoming slippery due to sweat that has been secreted by the hand.

The object is achieved in that a control lever for controlling an agricultural vehicle is provided with a grip head that includes a gripping surface on which an operator can rest the hand, and in which air-permeable openings are formed. Since these openings allow air to reach the hand, sweat on the hand can evaporate.

The portion of openings in the surface of the gripping surface should be at least approximately 25% to ensure sufficient aeration of the hand surface, but it should not be so great that the stability of the gripping surface is reduced or the solid surface is too small to comfortably support the hand. The portion of openings in the gripping surface therefore preferably does not exceed 75%.

The gripping surface can be advantageously designed at least partially as a grid, wherein the air-permeable openings are formed by the mesh of the grid.

Advantageously, the grid can be removable so it can be cleaned as necessary and/or to expose a cavity in the grip head situated behind it.

An inner cavity in the control lever can serve various purposes.

For example, the air-permeable openings can lead into the inner cavity. To ensure that water vapor that reaches the cavity via the openings can escape, this cavity advantageously communicates with the surroundings via at least one opening which is disposed on a top side of the grip head.

An opening of this type can be part of the gripping surface, where it enables air to be exchanged between the cavity and the surroundings at least when the hand has been lifted off of the gripping surface. Even when the hand rests on the gripping surface, the hand does not normally hermetically close all openings in the gripping surface. To ensure that air exchange is never impeded, the opening can also be disposed outside of the gripping surface.

To also ensure that dirt particles that entered the openings of the gripping surface can be released, an opening can also be provided outside of the gripping surface on an underside of the grip head.

Openings on the top side and underside of the grip head facilitate air circulation through the inner cavity due to the chimney effect.

Moisture is removed particularly effectively by applying an active air flow in the cavity that is driven by a fan in particular.

A fan that drives the air flow can be advantageously situated outside of the grip head, and can communicate with the cavity of the grip head via a hollow shaft.

The cavity can be furthermore used to maintain a temperature of the handle that is comfortable for the user. To this end, the air flow that circulates in the cavity can be advantageously climate-controlled e.g. by drawing it from a heater or an air conditioner in the driver's cab.

At least one control element that can be actuated using one finger of a hand that rests on the gripping surface can be installed on the grip head.

To ensure that the hand can be cooled, the gripping surface can be furthermore composed at least partially of metal. This is particularly advantageous for harvesting vehicles such as a combine harvester or a forage harvester, which are used mainly during the warm months of the year.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
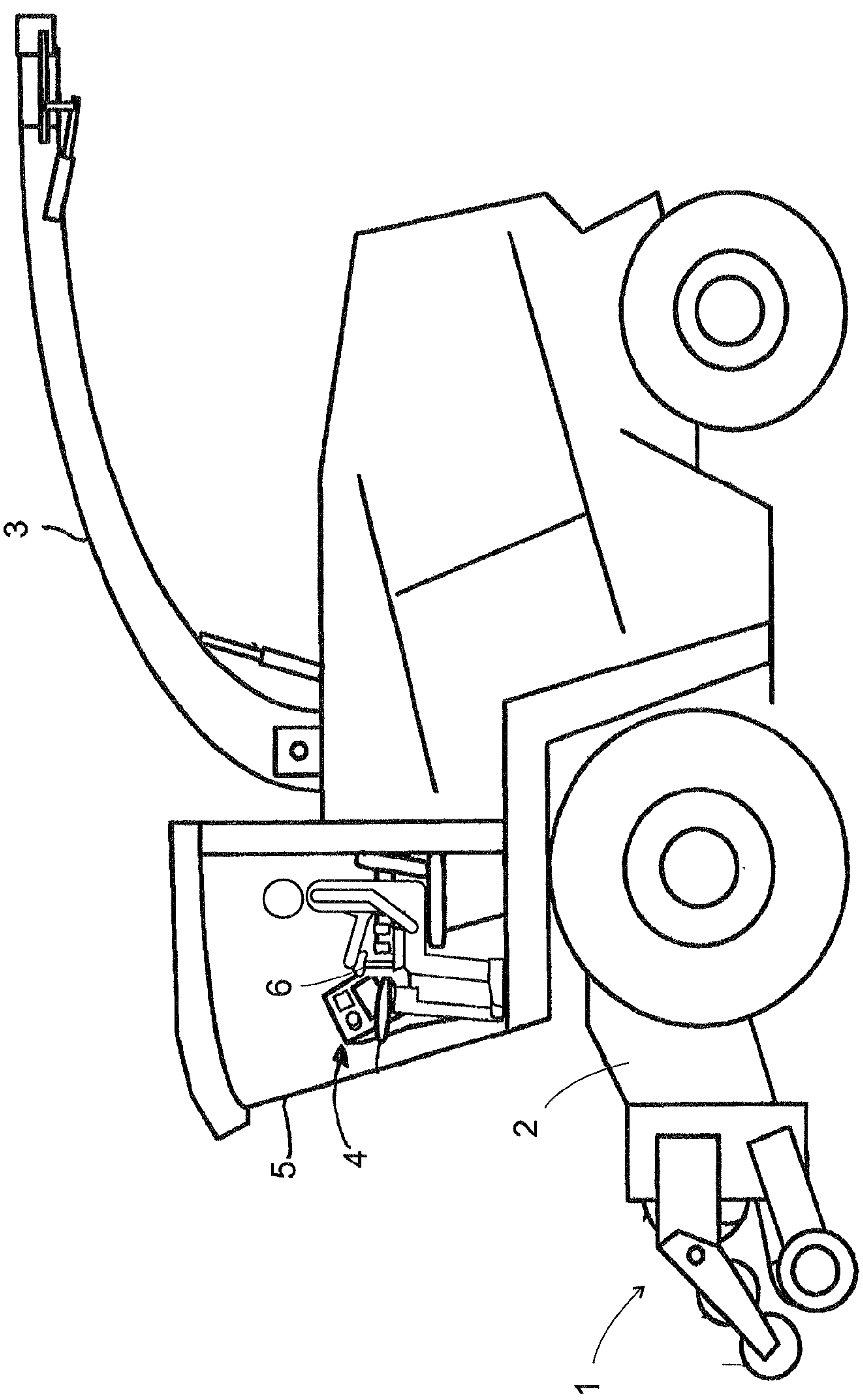
FIG. 1 a schematic view of a forage harvester as an example of an agricultural vehicle for which the control lever is provided.

A person skilled in the art is familiar with the basic features of the forage harvester depicted in FIG. 1, and so there is no need to describe its typical assemblies, such as front harvesting attachment 1, intake assembly 2, chopping mechanism, and transfer bend 3.

Control elements for controlling functions of these diverse assemblies are disposed in an instrument panel 4 of a driver's cab 5 and are situated there, in particular, on a multifunctional control lever 6. Control lever 6 can be displaced relative to instrument panel 4 to control the progressive motion of the forage harvester. It can have a single degree of freedom for displacement, for controlling forward and reverse motions of the forage harvester e.g. in the form of a gate guide of the type described in U.S. Pat. No. 6,715,269 B2. Preferably, however, control lever 6 has two degrees of freedom for displacement, one in the direction of travel for controlling the forward and reverse motion and ground speed, and one in the direction transverse to the vehicle for controlling the direction of travel. As the driver actively controls the forage harvester, he constantly grasps a grip head of the control lever by hand, wherein the hand always touches the same gripping surface on the grip head, which is not the case with a steering wheel.

The use of the control lever described below in greater detail is not limited to a forage harvester, of course, and may also be used for any other type of agricultural vehicle such as a tractor or a combine harvester.

Figure 2:
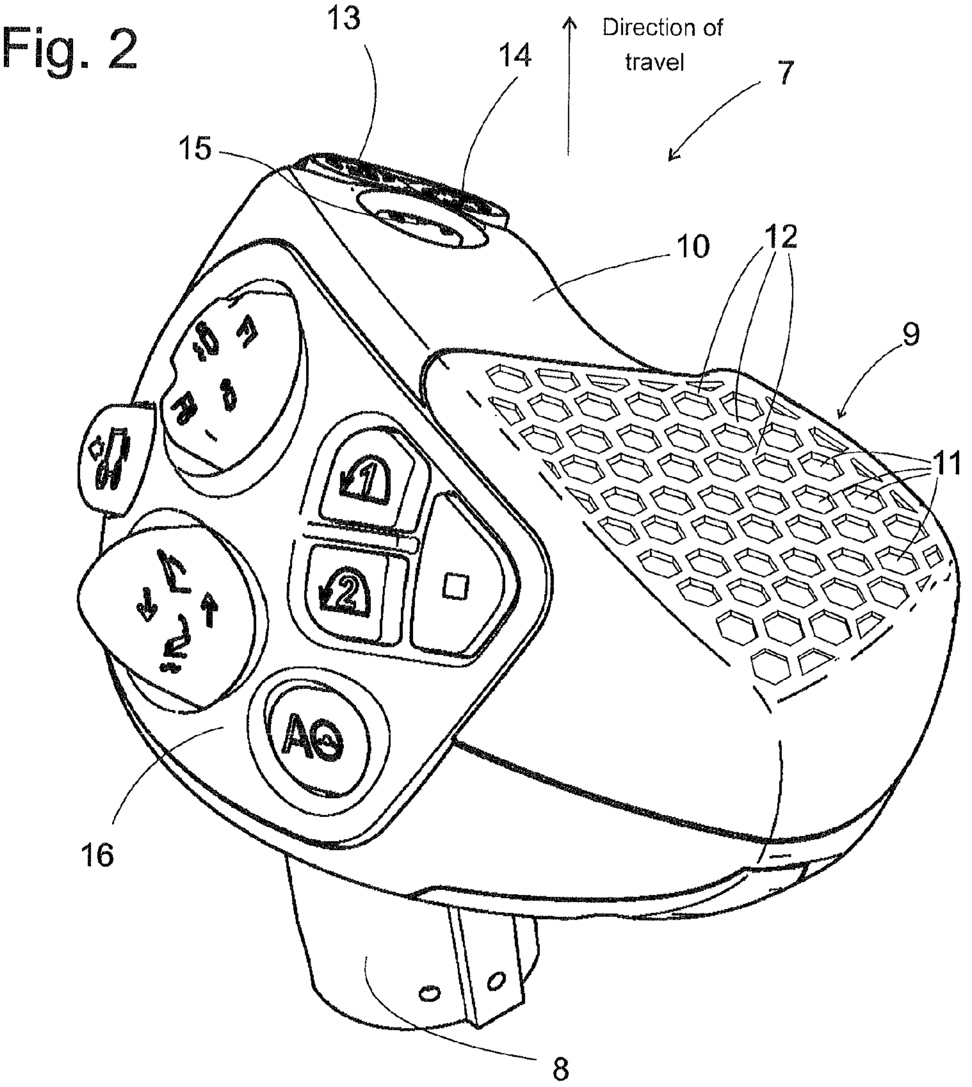
FIG. 2 a view of the grip head of the control lever from the view of the driver of the vehicle.

FIG. 2 shows a perspective view of grip head 7 of control lever 6, as viewed by the driver. A hollow neck 8 is integrally formed on the underside of grip head 7, and accommodates a shaft of control lever 6, which is not shown in FIG. 2 and connects grip head 7 to a joint in instrument panel 4.

Grip head 7 is irregularly shaped, and therefore individual sides are not sharply delineated from each other, and instead transition continuously into each other at edges that are rounded off to a more or less greater extent. Yet, a continuous surface is identifiable that is curved relatively slightly, is disposed on a top side that is approximately diametrically opposed to neck 8, and that includes a gripping surface 9 in its region facing the driver that is adapted to the shape and size of a driver's palm, and, adjacent thereto in the direction of travel, the continuous surface includes a control field 10. In FIG. 2, gripping surface 9 is characterized by a large number of small openings 11, which are substantially hexagonal in this case, between which segments 12 extend and form a grid. The width of the segments is between 1 and 2 mm, and the diameter of openings 11 is approximately two to three times greater than these values.

Entire gripping surface 9 is dimensioned in a manner such that it supports the metacarpal bones of the second to fifth fingers along their entire length. The width of adjacent control field 10 corresponds approximately to the combined width of the index finger and the middle finger. When the driver's hand rests on gripping surface 9, it is therefore possible for the driver to use the index finger and the middle finger, when they are substantially in the extended position, to operate two buttons 13, 14 on the front—relative to the direction of travel—end of control field 10, while the ring finger and the little finger grasp a highly slanted flank on a side of grip head 7 that faces away from the driver and is not visible in FIG. 2. The driver is therefore able to operate buttons 13, 14 without changing the position of the hand on grip head 7, and, at the same time, to use the remaining fingers to pull grip head 7 toward himself, or to push grip head 7 forward using the palm of his hand which is resting on gripping surface 9.

A further button 15 of control field 10 can be operated using the index finger in a curved position.

A further control field 16 on a lateral flank of the grip head contains buttons, rocker switches, or the like, which can be operated using the thumb of the hand that is resting on gripping surface 9.

Figure 3:
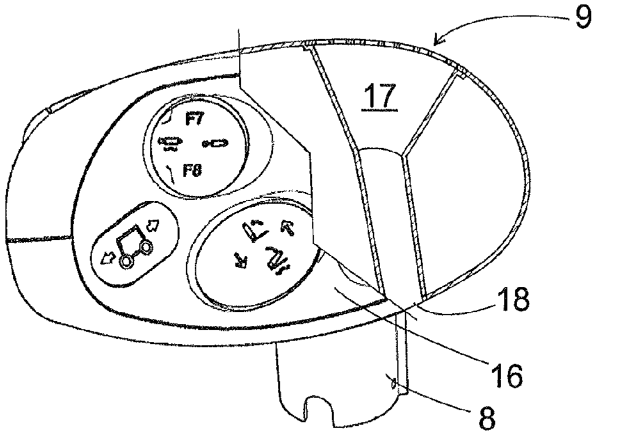
FIG. 3 a partially exposed side view of the grip head depicted in FIG. 2.

Openings 11 in gripping surface 9 enable sweat that is secreted by the hand resting thereon to evaporate, thereby ensuring that the hand surface will always remains dry and not slip on gripping surface 9. As shown in FIG. 3, the water vapor released via evaporation enters an inner cavity 17 of grip head 7 which is open toward its underside. The moisture is thereby able to escape to the surroundings via opening 18 in the underside of the grip head; the same applies for dirt particles that eventually reach cavity 17 through openings 11.

Figure 4:
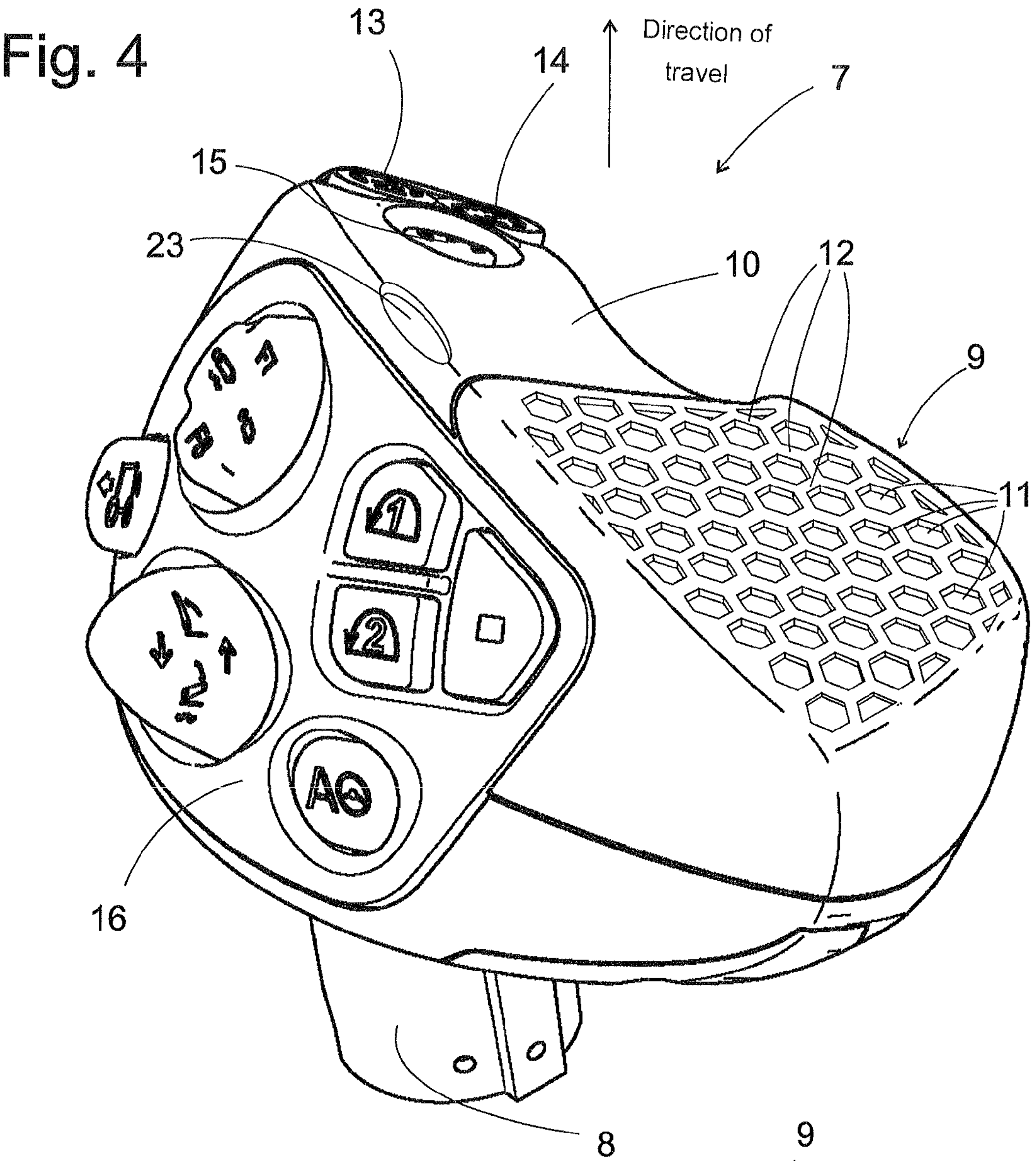
FIG. 4 a view, according to a second embodiment, which is analogous to FIG. 2.

The grip head shown in FIG. 4 differs visibly from that shown in FIG. 2 only by the presence of one additional opening 23 disposed on an edge between control field 10 on the top side of the grip head and lateral control field 16. Due to this placement, opening 23 is typically exposed when the driver's hand rests on gripping surface 9, regardless of the number and position of fingers on control field 10. Opening 23 communicates with the same inner cavity in grip head 7 as openings 11 in gripping surface 9, thereby enabling moist, warm air to exit the cavity via opening 23.

In deviation from the depiction shown in FIG. 4, opening 23 could also be situated such that it is directly adjacent to gripping surface 9; in other words, the grid formed by segments 12 could be dimensioned such that it is not entirely covered by the hand, and instead openings on the edge remain exposed when the hand rests thereon.

Figure 5:
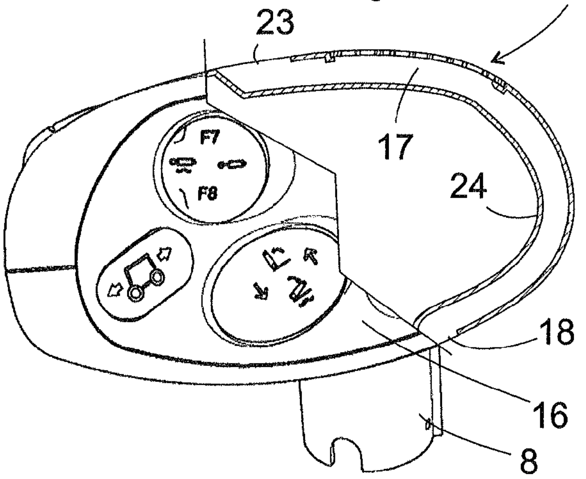
FIG. 5 a partially exposed side view of the grip head depicted in FIG. 4.

To intensify the exchange of air between cavity 17 and the surroundings, it is expedient, as shown in FIG. 5, to also connect cavity 17 to the surroundings via an opening 18 in the underside of the grip, and so, when warm air exits through opening 23, fresh air can flow in from the bottom via opening 18. To hereby facilitate cooling of the driver's hand using the chimney effect, cavity 17 is bounded here by an inner wall 24 that extends substantially equidistantly along gripping surface 9.

Figure 6:
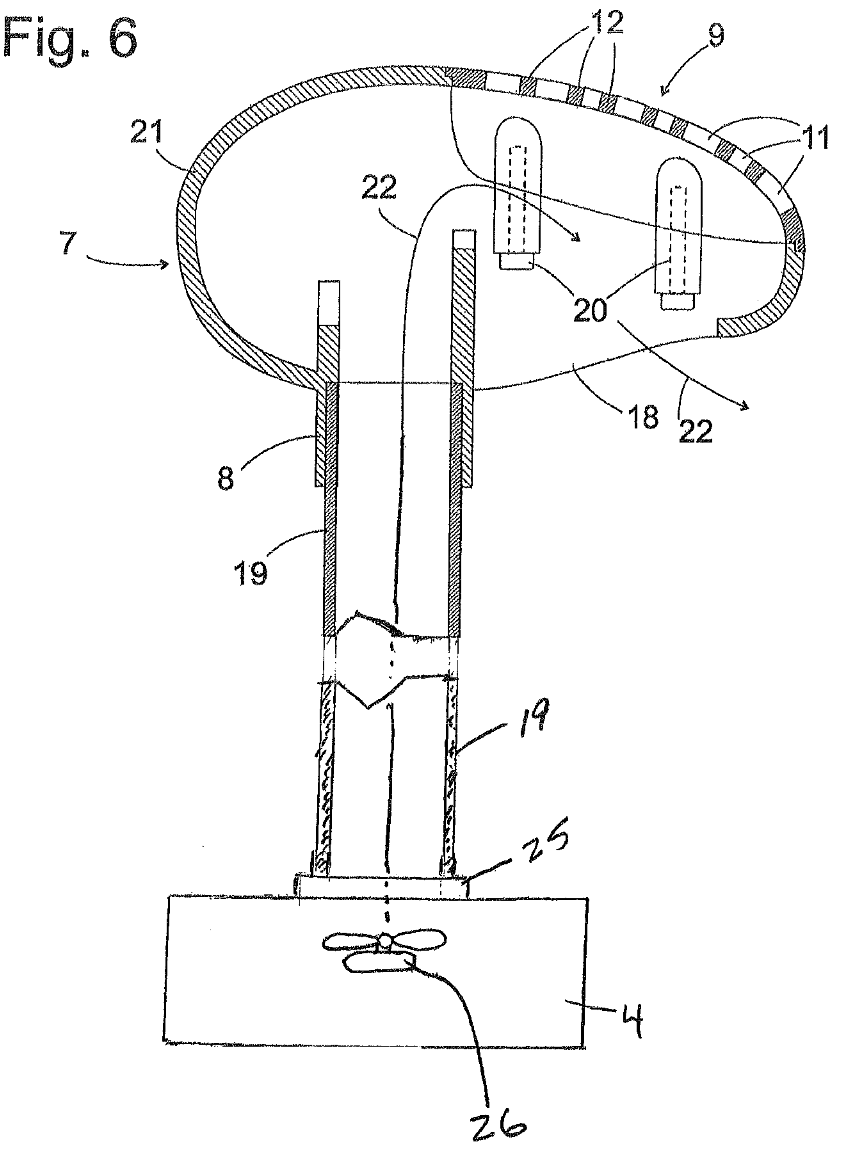
FIG. 6 a schematic cross section through a control lever according to a third embodiment.

FIG. 6 shows a schematic cross section through grip head 7 and shaft 19 on which it is mounted, according to a further-developed embodiment of the invention. Although the schematic depiction in FIG. 6 does not show any buttons or other types of control elements, they can indeed be present here in the same manner as shown in FIGS. 2 through 5. The embodiment shown in FIG. 6 differs from those described above mainly in terms of two aspects that can be implemented independently of each other.

According to the first aspect, screws 20 are accessible through large-area opening 18 on the underside of grip head 7; screws 20 detachably secure gripping surface 9 to housing 21; gripping surface 9 is realized as a component that is separate from the remaining housing 21 of grip head 7. It is therefore possible to remove gripping surface 9 to thoroughly clean openings 11 if necessary.

Gripping surface 9 can be formed by the injection molding of plastic, or it can be made of a piece of sheet metal, in particular using deep drawing and punching.

According to the second aspect, hollow shaft 19 connects inner cavity 17 of grip head 7 to a (not shown) fan in driver's cab 5. A constant air flow 22 through shaft 19 and cavity 17 thereby ensures that evaporated moisture will be continually drawn off.

The fan can be part of a heater or an air conditioner that supplies warmed or cooled air to cab 5 via nozzles disposed in instrument panel 4 or at other suitable locations in cab 5. When the heater or air conditioner is operating, the air flow supplied to control lever 6 is likewise preheated or cooled. As a result, gripping surface 9 can be held at a comfortable temperature when used in cold weather. This is advantageous in particular when gripping surface 9 is metallic since it tends to feel uncomfortably cold in cold surroundings. Conversely, if an air conditioner is present, cooled air can be supplied to hold the grip at a temperature at which sweat formation is minimized, thereby enabling gripping surface 9 to also be manufactured out of a thermally less conductive material such as a plastic in this case.

It will be understood that each of the elements described above, or two or more together, may also find a useful application in other types of constructions differing from the types described above.

While the invention has been illustrated and described as embodied in a control lever for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A control lever for controlling a vehicle, comprising an irregularly-shaped grip head including a removable gripping surface for a hand of an operator;

an inner cavity; and air-permeable openings provided in said gripping surface;

wherein said air-permeable openings lead into said inner cavity which communicates with surroundings via at least one further opening disposed outside of said gripping surface; and wherein said at least one further opening disposed outside of said gripping surface is situated in an underside of said grip head in order that said grip head facilitate air circulation through the inner cavity from the opening in the underside to and out of said air-permeable openings due to the chimney effect.

2. The control lever as defined in to claim 1, wherein said gripping surface is at least partially formed as a grid.

3. The control lever as defined in claim 2, where said air-permeable openings have dimensions in said grid, which dimensions are greater than a width of segments separating any two of said openings in said grid.

4. The control lever as defined in claim 1, wherein at least one of said air-permeableopenings is disposed on a top side of said grip head.

5. The control lever as defined in claim 1, where said inner cavity is formed so that an actively driven air flows in said inner cavity.

6. The control lever as defined in claim 1, further comprising at least one control element actuated using one finger of a hand that rests on said gripping surface and installed on said grip head.

7. The control lever as defined claim 1, wherein said air-permeable openings cover at least 25% of a surface of said gripping surface.

8. The control lever as defined in claim 7, wherein said air-permeable openings cover up to 75% of said surface of said gripping surface.

9. The control lever as defined in claim 1, wherein said gripping surface is at least partially composed of metal.

10. The control lever as defined in claim 1, wherein said control lever is formed as a lever installed on an agricultural vehicle.

* * * * *